United States Patent
Li et al.

(10) Patent No.: US 8,300,715 B2
(45) Date of Patent: Oct. 30, 2012

(54) METHOD AND APPARATUS FOR REUSE OF WAN INFRASTRUCTURE RESOURCES IN A WIRELESS PEER-TO-PEER (P2P) NETWORK

(75) Inventors: Junyi Li, Bedminster, NJ (US); Xinzhou Wu, Monmouth Junction, CA (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 938 days.

(21) Appl. No.: 12/169,093

(22) Filed: Jul. 8, 2008

(65) Prior Publication Data
US 2009/0016456 A1    Jan. 15, 2009

Related U.S. Application Data

(60) Provisional application No. 60/948,975, filed on Jul. 10, 2007.

(51) Int. Cl.
*H04K 1/10* (2006.01)
(52) U.S. Cl. ........ 375/260; 375/316; 375/132; 375/267; 370/208; 370/335
(58) Field of Classification Search .................. 375/260, 375/267, 316, 132; 370/208, 315, 335, 329, 370/342, 210, 344; 455/260, 444
See application file for complete search history.

(56) References Cited

U.S. PATENT DOCUMENTS

| | | | | |
|---|---|---|---|---|
| 6,961,364 B1 * | 11/2005 | Laroia et al. | .................. | 375/132 |
| 7,092,353 B2 * | 8/2006 | Laroia et al. | .................. | 370/210 |
| 7,295,509 B2 * | 11/2007 | Laroia et al. | .................. | 370/208 |
| 7,551,546 B2 * | 6/2009 | Ma et al. | .................. | 370/208 |
| 7,764,747 B2 * | 7/2010 | Ionescu | .................. | 375/316 |
| 7,961,698 B2 * | 6/2011 | Wu et al. | .................. | 370/344 |
| 2009/0303918 A1 * | 12/2009 | Ma et al. | .................. | 370/315 |

FOREIGN PATENT DOCUMENTS

| | | |
|---|---|---|
| JP | 08204683 | 8/1996 |
| JP | 2003209878 A | 7/2003 |
| JP | 2005341290 A | 12/2005 |
| JP | 2007165999 A | 6/2007 |
| JP | 2008510343 A | 4/2008 |
| KR | 20070046845 A | 5/2007 |
| WO | WO2006016330 A1 | 2/2006 |
| WO | WO2007052766 A1 | 5/2007 |

OTHER PUBLICATIONS

Rohde & Schwarz, "Introduction to the PHY",IEEE802.16, 2004, pp. 1-45.

* cited by examiner

*Primary Examiner* — David Ometz
*Assistant Examiner* — Fitwi Hailegiorgis
(74) *Attorney, Agent, or Firm* — Peng Zhu; James K. O'Hare

(57) ABSTRACT

To make efficient use of a frequency spectrum, a peer-to-peer network shares a wide area network (WAN) frequency spectrum as well as a time-frequency structure of the WAN, where the time-frequency structure includes a set of tones and symbols. A first wireless terminal monitors the time-frequency structure of the WAN to determine which subsets of tone-symbols are unused for WAN and/or other peer-to-peer connections. Then, the first wireless terminal selects and uses an unused subset of tone-symbols within the time-frequency structure for its peer-to-peer connection with a second wireless terminal.

42 Claims, 10 Drawing Sheets

METHOD AND APPARATUS FOR REUSE OF WAN INFRASTRUCTURE RESOURCES IN A WIRELESS PEER-TO-PEER (P2P) NETWORK

CLAIM OF PRIORITY UNDER 35 U.S.C. §119

The present Application for Patent claims priority to U.S. Provisional Application No. 60/948,975 entitled "Method and Apparatus for Infrastructure Interference Cancellation with Multiple Antennas in a Wireless Peer-to-Peer (P2P) Network" filed Jul. 10, 2007, and assigned to the assignee hereof and hereby expressly incorporated by reference herein.

BACKGROUND

1. Field

Various embodiments are directed to methods and apparatus for wireless communication and, more particularly, to methods and apparatus related to sharing of a frequency spectrum between a wide area network and a wireless peer-to-peer (P2P) network.

2. Background

In a wireless network, e.g., an ad hoc network, in which a network infrastructure does not exist, a terminal has to combat certain challenges in order to set up a communication link or connection with another peer terminal. One challenge is that when a terminal just powers up or moves into a new area, the terminal may have to first find out whether another terminal is present in the vicinity before any communication between the two terminals can start.

Due to the lack of the network infrastructure, terminals in an ad hoc wireless network may often not have a common timing reference which can assist in traffic management. So it is possible that when a first terminal is transmitting a signal and a second terminal is not in the receiving mode, therefore the transmitted signal does not help the second terminal to detect the presence of the first terminal. Power efficiency has great impact on the battery life of the terminals and is thus another important issue in the wireless system.

Additionally, a plurality of wireless terminals may operate in an environment while sharing a frequency spectrum to establish ad hoc peer-to-peer communications. Because such ad hoc peer-to-peer communications are not centrally managed by a centralized controller, interference between multiple peer-to-peer connections among nearby wireless terminals is problem. That is, transmissions from a wireless terminal may cause interference with other unintended receiver wireless terminals.

Consequently, a solution is needed to permit peer-to-peer communications a shared frequency spectrum while reducing unwanted interference to other wireless terminals.

SUMMARY

To make efficient use of a frequency spectrum, a peer-to-peer network shares a wide area network (WAN) frequency spectrum as well as a time-frequency structure of the WAN, where the time-frequency structure includes a set of tones and symbols. A first wireless terminal monitors the time-frequency structure of the WAN to determine which subsets of tone-symbols are unused for WAN and/or other peer-to-peer connections. Then, the first wireless terminal selects and uses an unused subset of tone-symbols within the time-frequency structure for its peer-to-peer connection with a second wireless terminal.

In one example, a first wireless device communicates with a second wireless device within a wireless peer-to-peer communication network, where the wireless peer-to-peer communication network shares a frequency spectrum with a wireless wide area network. A time frequency structure is partitioned into a plurality of subsets of tone-symbols, the time frequency structure including a plurality of orthogonal frequency-division multiplexing (OFDM) symbols and each of the plurality of OFDM symbols including a plurality of tones, a tone-symbol being one tone in one of the plurality of OFDM symbol. The first wireless device then selects a first plurality of the subsets of tone-symbols and transmits a signal to the second wireless device using the selected subset of the plurality of subsets of tone-symbols.

Each subset of tone-symbols in the time frequency structure may be disjoint, independent, or non-overlapping from each other. Each subset of tone-symbols may include a tile of tone-symbols in the time frequency structure, the tile of tone-symbols consisting of contiguous tones in each of a plurality of contiguous OFDM symbols. The selected first plurality of the subsets of tone-symbols is selected such that the transmitted signal is at least partially non-overlapping with a second signal transmitted in the wireless wide area network.

The first device may further monitor the shared frequency spectrum to measure the power of signals transmitted in the wireless wide area network. One or more subsets of tone-symbols may be identified for which the measured power of signals transmitted in the wireless wide area network are below a threshold. Consequently, the selected first plurality of the subsets used to transmit the signal to the second device may be derived from the identified subsets.

A second signal transmitted in the wireless wide area network may be generated using a second plurality of the subsets of tone-symbols. The second plurality of the subsets is at least partially non-overlapping with the selected first plurality of the subsets of tone-symbols selected to be used by the first device.

The first device may also transmit a set of pilot modulation symbols in the selected first subset of the plurality of subsets of tone-symbols to facilitate signal recovery at the second device, each of selected subsets of tone-symbols used by the first device including at least one tone-symbol to transmit the pilot modulation symbols. In one implementation, the first device may instead restrain from transmitting any signal in a set of tone-symbols in the selected first plurality of the subsets of tone-symbols to facilitate signal recovery at the second device, each of selected subsets of tone-symbols used by the first device including at least one tone-symbol in which no signal is to be transmitted.

The second signal transmitted in the wireless wide area network also includes a set of pilot modulation symbols. Each of subsets of tone-symbols used by the wireless wide area network second signal may include at least one tone-symbol to transmit the pilot modulation symbols. However, the tone-symbol used by the pilot of the wireless wide area network signal is different from the tone-symbol used by the pilot of the signal transmitted by the second device.

The first device may also monitor the shared spectrum to derive symbol timing information of a signal transmitted in the wireless wide area network. It may then adjust the transmission timing as a function of the derived symbol timing information. Alternatively, the first device may receive a control message from the second device, the control message including a timing adjustment request. The first device may then adjust the transmission timing as a function of the timing adjustment request. The transmission timing is adjusted so that the OFDM symbols of the first signal transmitted to the first device are aligned with the OFDM symbols of the signal transmitted in the wireless wide area network.

In another example, a second wireless device may communicate with a first wireless device within a wireless peer to peer communication network. A composite signal may be received by the second device in a frequency spectrum shared between the peer-to-peer communication network and a wireless wide area network. The composite signal may include an intended signal transmitted from the first device to the second device and an interfering signal transmitted from a first wireless wide area device to a second wireless wide area device of the wide area network. The intended signal may include a plurality of OFDM symbols and each of the plurality of OFDM symbols including a plurality of tones. The second device may then retrieve modulation symbols from the received composite signal based on a time frequency structure determined by the tones and OFDM symbols of the intended signal, one modulation symbol being retrieved one tone-symbol, a tone-symbol being one tone in one of the plurality of OFDM symbols. The retrieved modulation symbols may be partitioned into a plurality of subsets, each of the retrieved modulation symbol subsets corresponding to the modulation symbols retrieved in a corresponding subset of tone-symbols in the time frequency structure. The second device can then determine the interference strength of each of the retrieved modulation symbol subsets. A retrieved modulation symbol subset is discarded if the corresponding interference strength exceeds a threshold. The intended signal is then decoded from the remaining retrieved modulation symbol subsets. The subset of tone-symbols in the time frequency structure may correspond to the retrieved modulation symbol subsets is disjoint with each other. A subset of tone-symbols may correspond to one of the retrieved modulation symbol subsets includes a tile of tone-symbols in the time frequency structure, the tile of tone-symbols consisting of contiguous tones in each of a plurality of contiguous OFDM symbols. The interfering signal may also include a plurality of OFDM symbols and each of the plurality of OFDM symbols including a plurality of tones, and wherein the symbol duration of an OFDM symbol of the intended signal is substantially the same as the symbol duration of an OFDM symbol of the interfering signal and the tone spacing of the intended signal is substantially the same as the tone spacing of the interfering signal.

The second device may be further configured to identifying a set of pilot modulation symbols within each of the retrieved modulation symbol subsets. The set of pilot modulation symbols may correspond to a pilot tone-symbol structure of the interfering signal, the pilot tone-symbol structure of the interfering signal being fixed and known to the second device. The second device then measures the received power of the set of pilot modulation symbols. The interference strength of the corresponding retrieved modulation symbol subset may be determined as a function of the measured received power of the set of pilot modulation symbols.

In some implementations, the second device is equipped with multiple receive antennas. One set of modulation symbols of the received composite signal is retrieved from each of the multiple receive antennas. Each set of retrieved modulation symbols is then partitioned into a plurality of subsets, each subset corresponding to the modulation symbols retrieved in a corresponding subset of tone-symbols in the time frequency structure from the corresponding receive antenna. A first set of pilot modulation symbols corresponding to each receive antenna is identified, where the first set of pilot modulation symbols correspond to a pilot tone-symbol structure of the interfering signal. The second device then calculates a set of receive coefficients, each corresponding to one of the multiple receive antennas, as a function of the first sets of pilot modulation symbols received in the multiple receive antennas. The subsets of retrieved modulation symbols corresponding to the multiple receive antennas are combined by applying each of the calculated set of receive coefficients to the corresponding subset of retrieved modulation symbols. The intended signal from the combined modulation symbols can then be decoded.

The set of receive coefficients may be calculated to minimize the remaining power of the interfering signal in the combined modulation symbols.

The second device may be further configured to identify a second set of pilot modulation symbols corresponding to each receive antenna, the second set of pilot modulation symbols corresponding to a pilot tone-symbol structure of the intended signal. The set of receive coefficients may also be determined as a function of the second sets of pilot modulation symbols received in the multiple receive antennas, and the set of receive coefficients may be calculated to maximize the signal-to-interference ratio in the combined modulation symbols.

The pilot structure of the intended signal may be different from the pilot structure of the interfering signal and the first and second sets of pilot modulation symbols are different.

For instance, the first and second sets of pilot modulation symbols may be disjoint or independent of each other.

Moreover, the second device may also deriving timing synchronization information from the interfering signal and requests the first device to adjust the transmission timing in a subsequent time as a function of the derived timing synchronization information. The transmission timing may be requested to be adjusted so that the OFDM symbols of the intended signal from the first device are aligned with the OFDM symbols of the interfering signal.

In one example, the first wireless wide area device may be a wireless access terminal and the second wireless wide area device may be a base station. In another example, the second wireless wide area device may be a wireless access terminal and the first wireless wide area device may be a base station.

The various features describe herein may be implemented within a wireless device, a circuit or processor incorporated in a wireless device, and/or a software.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
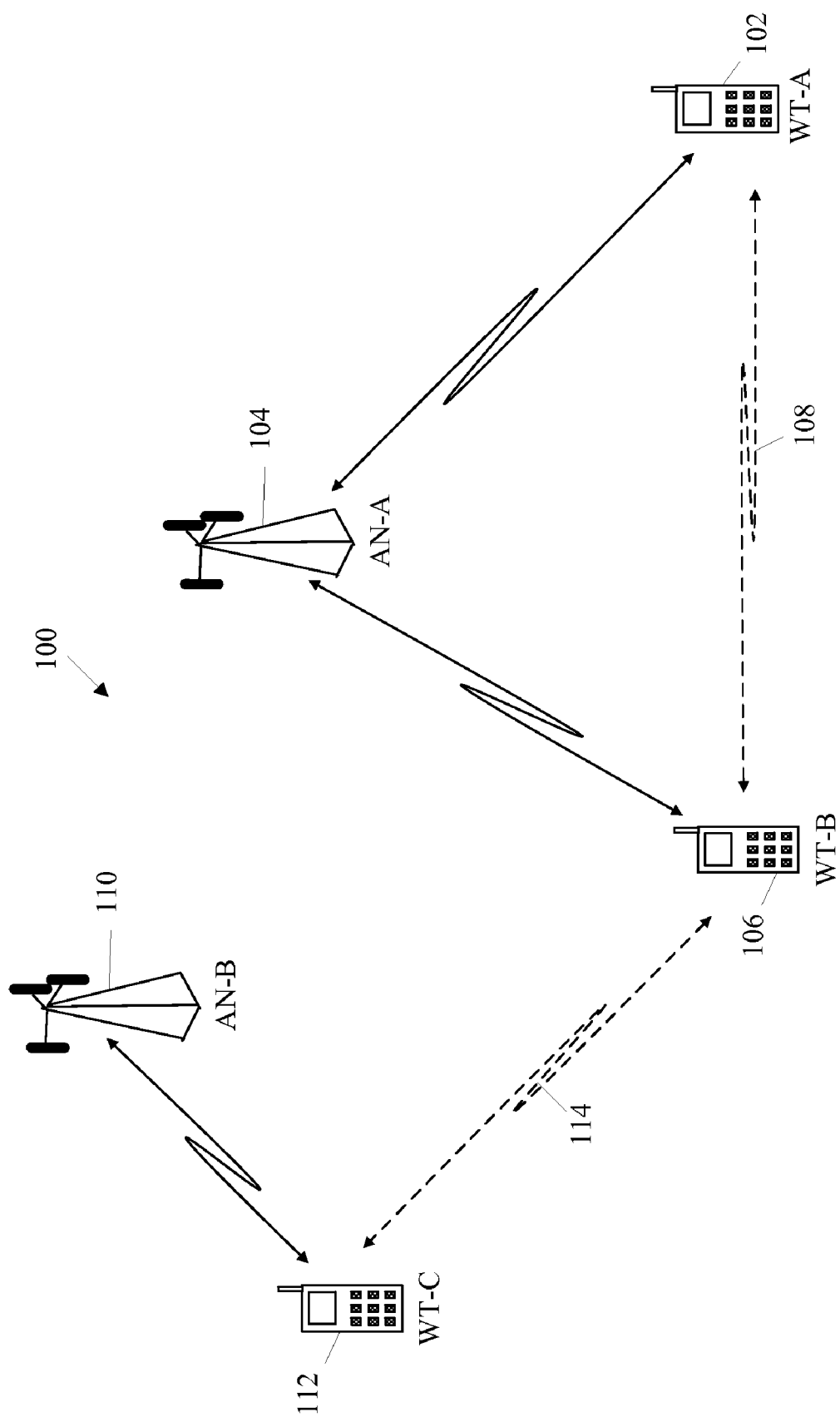
FIG. 1 is a block diagram illustrating the how an ad hoc peer-to-peer network may be implemented, e.g., in conjunction a wide area network.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Overview

One feature provides for establishing an ad hoc peer-to-peer network over an existing channel allocation for another network, such as a wide area network (WAN). Sharing of a frequency spectrum by two networks allows reusing the same transmitter and/or receiver hardware in a terminal to communicate over the two networks, thereby reducing hardware and/or power consumption. According to one implementation, the peer-to-peer network may also reuse the uplink and/or downlink signaling structure (e.g., pilot tone-symbol structure, UMB tile structure, etc.) for the WAN. The peer-to-peer network may concurrently use the WAN signaling structure and frequency spectrum to efficiently utilize spectrum resources. Such reuse of the WAN signaling structure is particularly helpful where the peer-to-peer network has no centralized management, thereby facilitating interference management among devices sharing the frequency spectrum.

Ad Hoc Communication System

An ad hoc peer-to-peer wireless network may be established among two or more terminals without intervention of a centralized network controller. In some examples, the wireless network may operate within a frequency spectrum shared among a plurality of wireless terminals.

FIG. 1 is a block diagram illustrating the how an ad hoc peer-to-peer network may be implemented, e.g., in conjunction a wide area network. In some examples, the peer-to-peer network and the wide area network may share the same frequency spectrum. In other examples, the peer-to-peer network is operated at a different frequency spectrum, e.g., a spectrum dedicated to the use of the peer-to-peer network. A communication system 100 may comprise one or more wireless terminals WT-A 102, WT-B 106, and WT-C 112. Although just three wireless terminals WT-A 102, WT-B 106, and WT-C 112 are depicted, it is to be appreciated that communication system 100 may include any number of wireless terminals. The wireless terminals WT-A 102, WT-B 106, and WT-C 112 can be, for example, cellular phones, smart phones, laptops, handheld communication devices, handheld computing devices, satellite radios, global positioning systems, PDAs, and/or any other suitable device for communicating over wireless communication system 100.

According to one example, the communication system 100 may support a wide area network (WAN) which may include one or more access nodes AN-A 104 and AN-B 110 (e.g., base station, access point, etc.) and/or any number of disparate access nodes (not shown) in one or more sectors/cells/regions that receive, transmit, repeat, etc., wireless communication signals to each other and/or to the one or more wireless terminals WT-A 102, WT-B 106, and WT-C 112. Each access node AN-A 104 and AN-B 110 may comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. According to an optional feature, when communicating through the WAN, the wireless terminal(s) may transmit signals to and/or receive signals from an access node when communicating via the wide area infra-structure network supported by the communication system 100. For instance, wireless terminals WT-A 102 and WT-B 106 may communicate with the network via access node AN-A 104 while wireless terminal WT-C 112 may communication with a different access node AN-B 110.

The wireless terminals may also communicate directly with each other via a local area peer-to-peer (P2P) network (e.g., ad hoc network). Peer-to-peer communications may be effectuated by directly transferring signals between wireless terminals. Thus, the signals need not traverse through an access node (e.g., a base station) or centrally managed network. The peer-to-peer network may provide short range, high data rate communication (e.g., within a home, office, etc. type setting). For example, wireless terminals WT-A 102 and WT-B 106 may establish a first peer-to-peer network 108 and wireless terminals WT-B 106 and WT-C 112 may also establish a second peer-to-peer network 114.

Additionally, each peer-to-peer network connection 108 and 114 may include wireless terminals within a similar geographic area (e.g., within range of one another). However, it is to be appreciated that wireless terminals need not be associated with the same sector and/or cell to be included in a common peer-to-peer network. Further, peer-to-peer networks may overlap such that one peer-to-peer network may take place within a region that overlaps or is encompassed with another larger peer-to-peer network. Additionally, a wireless terminal may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Peer-to-peer communications between the wireless terminals may be synchronous. For example, wireless terminals WT-A 102 and WT-B 106 may utilize a common clock reference to synchronize performance of distinct functions. The wireless terminals WT-A 102 and WT-B 106 may obtain timing signals from the access node AN-A 104. The wireless terminals WT-A 102 and WT-B 106 may also obtain timing signals from other sources, for instance, GPS satellites or television broadcast stations. According to an example, time may be meaningfully partitioned in a peer-to-peer network for functions such as peer discovery, paging, and traffic. Further, it is contemplated that each peer-to-peer network may set its own time.

Before communication of traffic in a peer-to-peer connection can take place, the two peer wireless terminals may detect and identity each other. The process by which this mutual detection and identification between peers takes place may be referred to as peer discovery. The communication system 100 may support peer discovery by providing that peers (terminals), desiring to establish peer-to-peer communications, periodically transmit short messages and listen to the transmissions of others. For example, the wireless terminals WT-A 102 (e.g., transmitting wireless terminal) may periodically broadcast or send signals to the other wireless terminal(s) WT-B 106 (e.g., receiving wireless terminal(s)). This allows the receiving wireless terminal WT-B 106 to identify the sending wireless terminal WT-A 102 when the receiving wireless terminal WT-B 106 is in vicinity of the sending wireless terminal WT-A 102. After identification, an active peer-to-peer connection 108 may be established.

Transmissions for peer discovery may periodically occur during specified times referred to as peer discovery intervals, the timing of which may be predetermined by a protocol and known to the wireless terminals WT-A 102 and WT-B 106. Wireless terminals WT-A 102 and WT-B 106 may each transmit respective signals to identify themselves. For example, each wireless terminal WT-A 102 and WT-B 106 may send a signal during a portion of a peer discovery interval. Further, each wireless terminal WT-A 102 and WT-B 106 may monitor signals potentially transmitted by other wireless terminals in a remainder of the peer discovery interval. According to an example, the signal may be a beacon signal. By way of another illustration, the peer discovery interval may include a number of symbols (e.g., orthogonal frequency-division multiplexing (OFDM) symbols). Each wireless terminal WT-A 102 may select at least one symbol in the peer discovery interval for transmission by that wireless terminal WT-A 102. Moreover, each wireless terminal WT-A 102 may transmit a corresponding signal in one tone in the symbol selected by that wireless terminal WT-A 102.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure. After wireless terminals discover each other, they may proceed to establish connections. In some examples, a connection links two wireless terminals, e.g., in FIG. 1 connection 108 links wireless terminals WT-A and WT-B. Terminal WT-A 102 can then transmit traffic to terminal WT-B 106 using connection 108. Terminal WT-B 106 can also transmit traffic to terminal WT-A 102 using connection 108.

Figure 2:
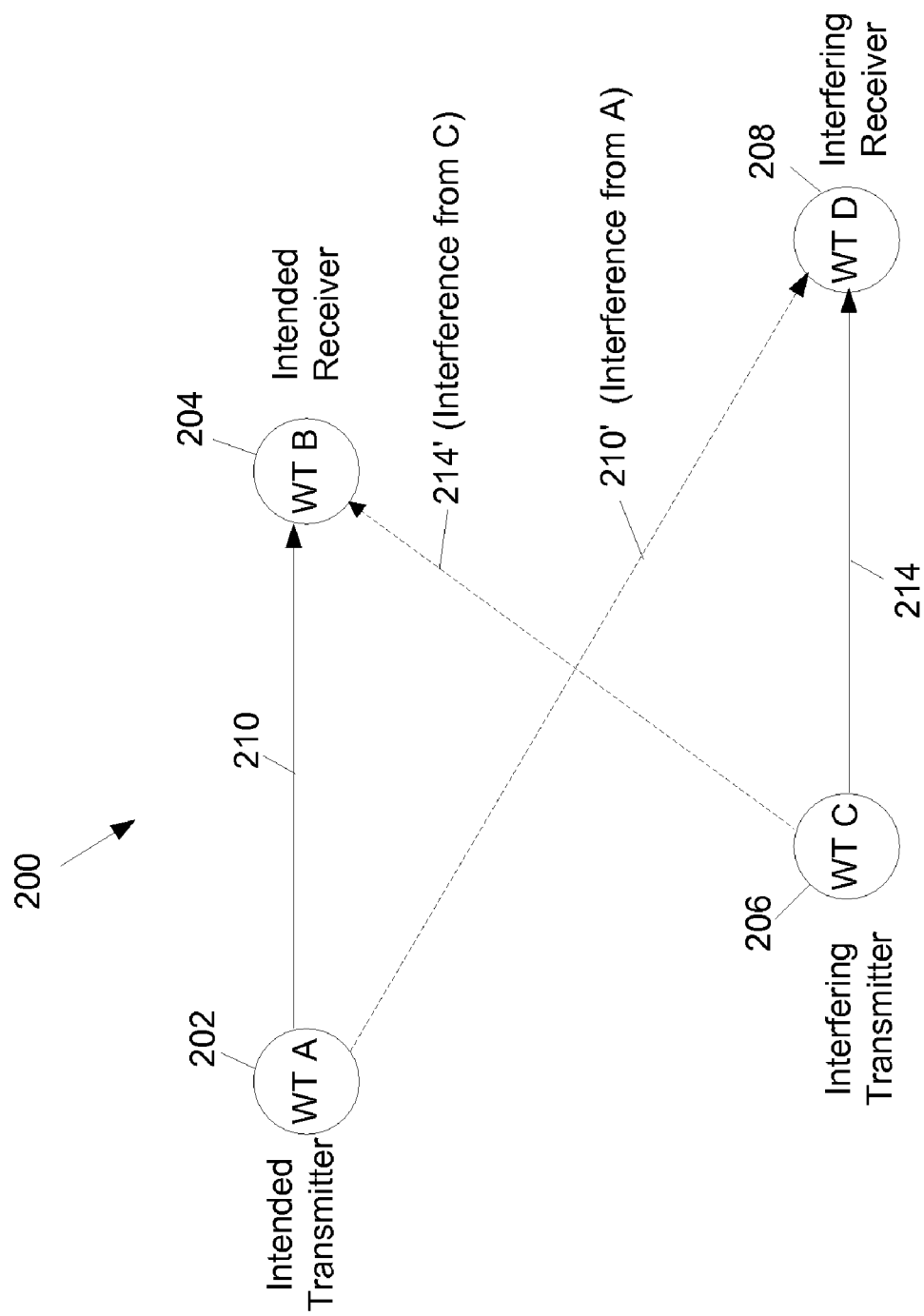
FIG. 2 is a block diagram illustrating an environment in which wireless terminals with peer-to-peer communication connections and wireless devices with wireless wide area network connections may interfere with each other as they share the same frequency spectrum in the vicinity.

FIG. 2 is a block diagram illustrating an environment in which wireless terminals with peer-to-peer communication connections and wireless devices with wireless wide area network connections may interfere with each other as they share the same frequency spectrum in the vicinity. In the example shown in the figure, WT A 202 intends to send a traffic signal to WT B 204, while in the same spectrum WT C 206 intends to send a traffic signal to WT D 208. Terminals WT A 202 and WT B 204 have a peer-to-peer connection while WT C 206 and WT D 208 have a wireless WAN connection. If the shared spectrum is downlink, then WT C 206 indeed represents a wireless WAN base station and WT D 208 represents a wireless WAN terminal. If the shared spectrum is uplink, then WT C 206 indeed represents a wireless WAN terminal and WT D 208 indeed represents a wireless WAN base station. In either case, the peer-to-peer signal transmitted by WT A 202 arrives at WT D 208 and becomes interference. The wireless WAN signal transmitted by WT C 206 arrives at WT B 204 and becomes interference. The present invention helps WT A 202 and WT B 204 to better manage the interference between the peer-to-peer connection and the wireless WAN connection.

In an ad hoc peer-to-peer communication system, multiple communications may take place using frequency spectrum resources shared in both space and time. Because of the distributed nature of the ad hoc peer-to-peer network, it may not always be possible to control the channel allocations (e.g., slots) used for transmissions between the wireless terminals. In wireless networks where a central authority does not exist, interference avoidance and/or management is a key feature to maintain the efficiency of the network performance.

Time-Frequency Structure Reuse

Figure 3:
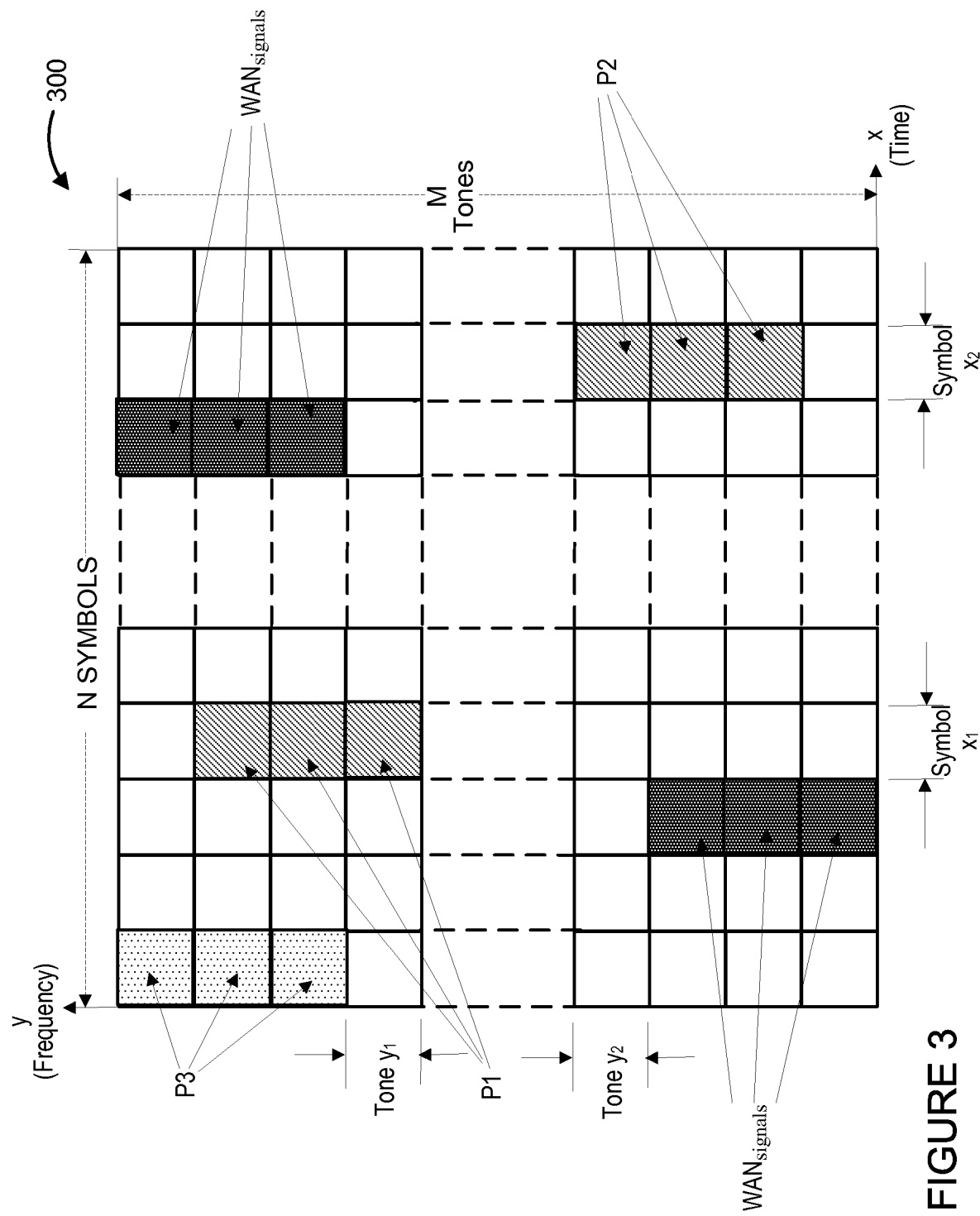
FIG. 3 illustrates an example time-frequency structure associated with a signal transmission.

FIG. 3 illustrates an example time-frequency structure 300 associated with a signal transmission. The exemplary signal may be an OFDM signal. The time-frequency structure 300 may be used for transmitting and/or receiving traffic signals (e.g., pilots, connection identifiers, etc.) over a peer-to-peer network. The time-frequency structure 300 may be concurrently used or shared between the WAN and a peer-to-peer network over a shared frequency spectrum. Since the devices operating in region are likely part of the WAN, they will have knowledge of the time-frequency structure 300 and synchronization information. The x-axis represents time and may include N symbols (e.g., where N may be any integer), and the y-axis represents frequency and may include M tones (e.g., where M may be any integer). Consequently, the time-frequency structure 300 includes a set of tones and symbols. In one example, a subset of tone-symbols may be referred to as a "tile" within the structure 300. The subset of tone-symbols may comprise one or more tones and one or more symbols. For example, a tile of tone-symbols may consist of contiguous tones in each of a plurality of contiguous OFDM symbols.

Transmitter and/or receiver devices communicating via a peer-to-peer connection may monitor broadcasts of the time-frequency structure 300 to determine which tone-symbols or tone-symbol subsets are in use by the WAN and/or other peer-to-peer connections. In this example, a plurality of subsets of tone-symbols $WAN_{signals}$ are in use by the wireless wide area network for WAN signaling. Each subset of tone-symbols $WAN_{signals}$ may include at least one tone-symbol for pilot modulation symbols. In one example, the power of one or more subsets of tone-symbols is measured to determine whether it is below a threshold, and thereby determine which subsets are unused.

The peer-to-peer transmitter device may then select a plurality of subsets of tone-symbols that is unused or lightly used by the WAN. Each of the selected subsets of tone-symbols may include at least one tone-symbol to transmit the pilot modulation symbols. For instance, the transmitter and/or receiver devices may select a tile P1 for their use since it is unused by the WAN. In another example, the transmitter may select a plurality of tiles or subsets of tone-symbols P1, P2 and P3 to send traffic to the receiver of the peer-to-peer connection.

In another embodiment, the peer-to-peer transmitter device transmits the traffic signal in a plurality of tiles or subsets of tone-symbols that are determined by the identifiers of the peer-to-peer connection, the transmitter and receiver devices, without checking whether the occupied tiles or subsets of tone-symbols are used by the WAN. The plurality of tiles or subsets is constructed such that they do not completely overlap with tone-symbols used by a wireless WAN signal. For example, suppose that a wireless WAN signal occupies the two dark tiles labeled as "$WAN_{signals}$". The transmitter device may send the traffic signal over subsets P1, P2, and P3 in a given traffic slot, as determined by the identifier of the connection. From one traffic slot to another, the transmitter device may use different plurality of subsets. In one traffic slot, P1, P2 and P3 are completely non-overlapping with "$WAN_{signals}$", while in a different traffic slot some of P1, P2 and P3 may overlap with some of "$WAN_{signals}$". In accordance with the invention, the tile structure used by the peer-to-peer connection is the same as that used by the wireless WAN connection, that is, both peer-to-peer and wireless WAN connections have the same notion of how the time-frequency grid is partitioned into tiles or subsets of tone-symbols. However, the plurality of subsets to be used by the peer-to-peer transmitter does not completely overlap with the plurality of subsets to be used by a wireless WAN transmitter in a given traffic slot. Hence, the peer-to-peer signal does not completely overlap with the wireless WAN signal.

In one example, each of the selected subsets of tone-symbols P1, P2 and P3 includes a pilot associated with the transmitter and/or receiver devices. Furthermore, each of the selected subsets of tone-symbols P1, P2 and P3 also includes a null pilot associated with the transmitter and/or receiver devices. A null pilot is a tone-symbol in the time-frequency grid 300. The transmitter does not transmit any signal in the null pilot and the receiver knows the location of the null pilot. The receiver can use the null pilot to estimate the interference power in the corresponding tile. Indeed, the energy detected in the null pilot may mostly be contributed by a wireless WAN signal. If there is a significant amount of energy detected in the null pilot, the receiver may consider the corresponding tile is not reliably and stop from using it in the decoding process. This could be the scenario where P3 tile overlaps with one of "$WAN_{signals}$" such that the peer-to-peer signal in P3 collides with a wireless WAN signal. Furthermore, if the receiver is equipped with multiple receive antennas, then the receiver may generate a set of combining coefficients to combine the signals received from those antennas. The set of combining coefficients may be determined to minimize the resultant energy from the interfering wireless WAN signal, to maximize the resultant energy from the desired peer-to-peer signal, or to maximize the signal to interference ratio. The determination of the set of combining coefficients is based on the measurement on the pilot and null pilot in the corresponding tile.

Peer-to-peer communication networks deployed in licensed bandwidth have the advantage of better quality-of-service control. However, the licensed bandwidth can be expensive and, hence, it may be desirable to reuse and infrastructure cellular bandwidth (i.e., frequency spectrum) for peer-to-peer network deployment. A consequence of the bandwidth reuse is that, on one hand, the peer-to-peer network may control its interference to the infrastructure communications and, on the other hand, peer-to-peer communications may experience interference from the infrastructure cellular network (e.g., WAN). Accordingly, mobiles in a peer-to-peer network perform an interference mitigation protocol to achieve a certain protection from the infrastructure network (WAN) and establish reliable communications.

According to one feature, wireless devices or mobile stations operating in a peer-to-peer network can cancel or mitigate interference from infrastructure networks using multiple antennas, where a wireless peer-to-peer communication networks share bandwidth with an infrastructure cellular network. In one implementation, a first spatial signature is measured from a wide area network (WAN) and a second spatial signature is measured from a peer-to-peer network. Interference mitigation is performed between the networks based on the measured spatial signatures.

According to another aspect, canceling and/or mitigating interference from an infrastructure network may be achieved by using multiple antenna techniques.

Figure 4:
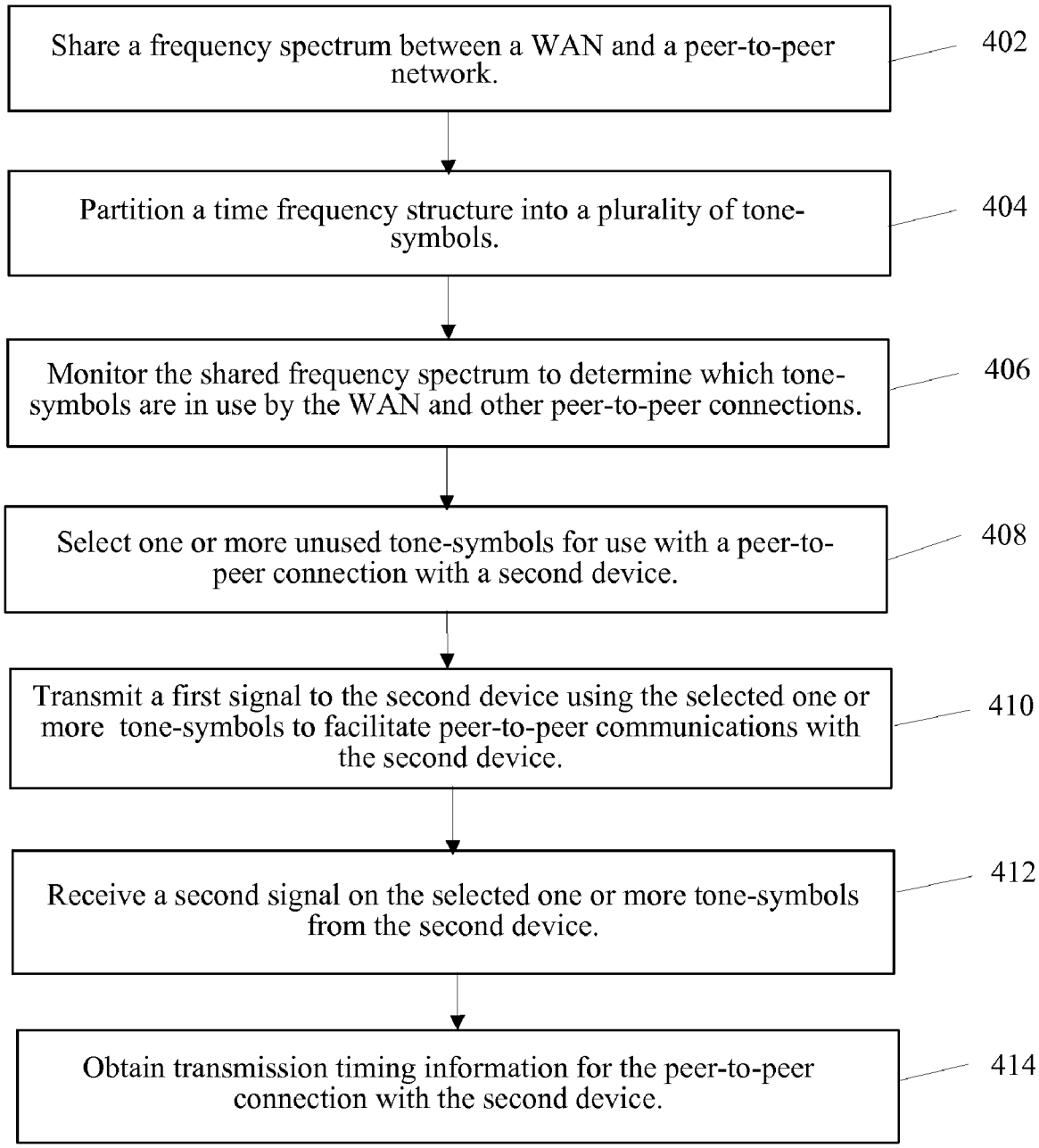
FIG. 4 illustrates a method operational in a first wireless device for reusing an infrastructure network pilot structure for using with an ad hoc peer-to-peer communication network.

FIG. 4 illustrates a method operational in a first wireless device for reusing an infrastructure network pilot structure for using with an ad hoc peer-to-peer communication network. In this example, a frequency spectrum is shared between a WAN and a peer-to-peer network 402. A time frequency structure like that illustrated in FIG. 3 may be partitioned into a plurality of tone-symbols 404. The first device may need to monitor signals from the wireless WAN in order to generate the time frequency grid structure. For example, the first device may receive a broadcast pilot or synchronization channel from the base station of the wireless WAN and then derive symbol time and frequency synchronization with the received broadcast signal. The first device then monitors the shared frequency spectrum to determine which tone-symbols are in use by the WAN and other peer-to-peer connections 406. One or more unused tone-symbols are then selected by the first device for use with a peer-to-peer connection with a second device 408. A first signal is transmitted by the first device to the second device using the selected one or more tone-symbols to facilitate peer-to-peer communications with the second device 410. Such first signal may be a pilot or a transmission request, for example. In a subsequent time period, the first device may receive a second signal on the selected one or more tone-symbols from the second device 412. For example, the second signal may be a second pilot or a transmission response. Additionally, the first device may also obtain transmission timing information for the peer-to-peer connection with the second device 414 (e.g., from pilots used by the WAN or from messaging from the second device). Such transmission timing information may serve to synchronize the first device with the second device as well as align their transmissions with those of the WAN.

Figure 5:
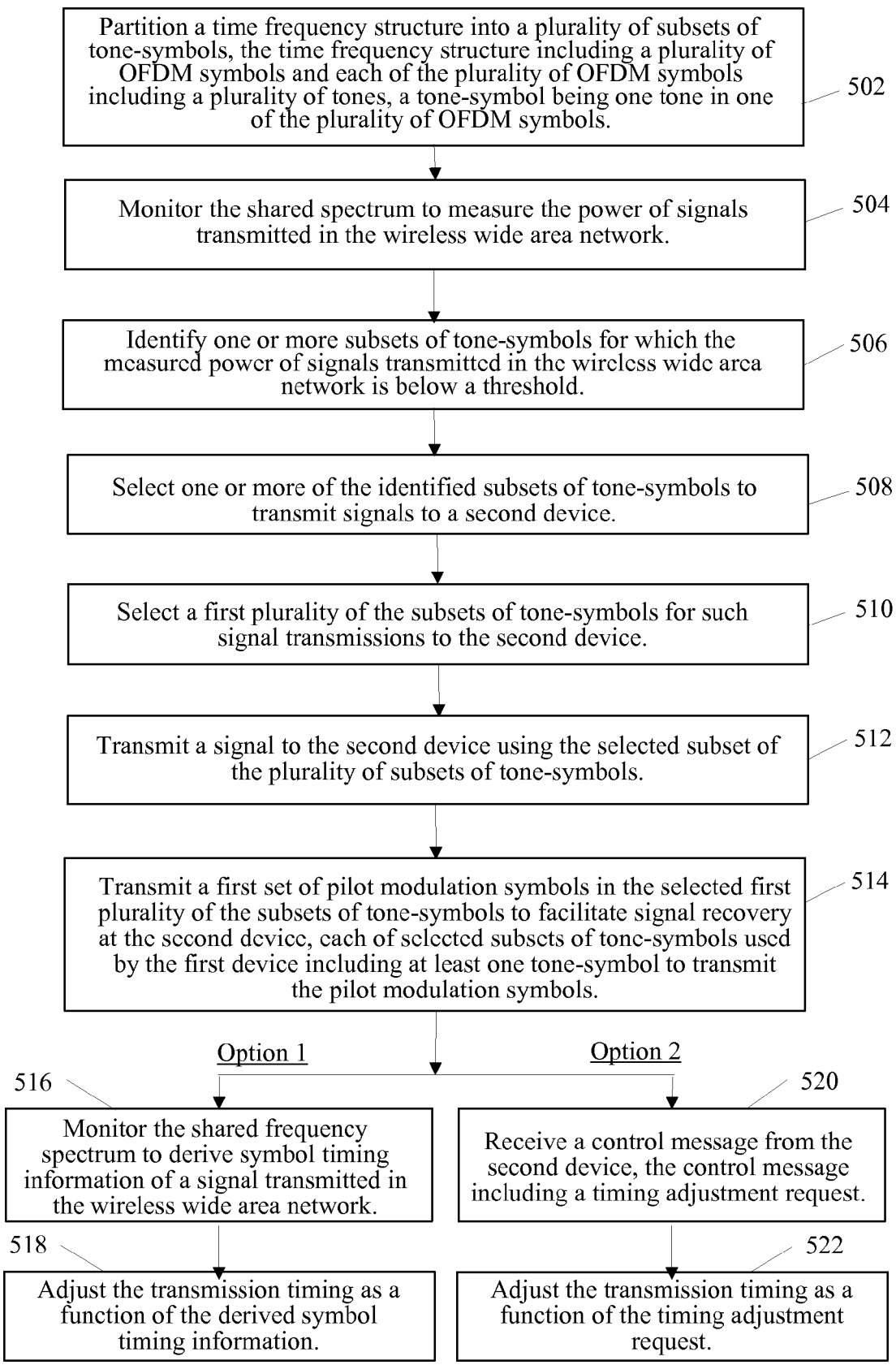
FIG. 5 illustrates a method operational in a first wireless device for reusing an infrastructure network pilot structure for using with an ad hoc peer-to-peer communication network.

FIG. 5 illustrates a method operational in a first wireless device for reusing an infrastructure network pilot structure for using with an ad hoc peer-to-peer communication network. In this example, the wireless peer-to-peer communication network shares a frequency spectrum with the infrastructure network (e.g. a wireless wide area network (WAN)). The first device seeks to establish or maintains a peer-to-peer connection with a second device. A time-frequency structure is partitioned into a plurality of subsets of tone-symbols, the time frequency structure including a plurality of OFDM symbols and each of the plurality of OFDM symbols including a plurality of tones, a tone-symbol being one tone in one of the plurality of OFDM symbols 502. The shared spectrum may be monitored by the first device to measure the power of signals transmitted in the wireless wide area network 504. One or more subsets of tone-symbols may be identified for which the measured power of signals transmitted in the wireless wide area network is below a threshold 506. That is, where the first device detects power levels below the threshold, it assumes that such tone-symbols are not in use by the WAN or other peer-to-peer connections.

One or more of the identified subsets of tone-symbols may be selected to transmit signals to the second device 508. Each subset of tone-symbols in the time frequency structure is independent from each other. In one example, each subset of tone-symbols may include a tile of tone-symbols in the time-frequency structure, the tile of tone-symbols may consist of contiguous tones in each of a plurality of contiguous OFDM symbols.

In particular, a first plurality of the subsets of tone-symbols may be selected for transmissions to the second device 510. For example, if a second signal is transmitted in the wireless wide area network (WAN) using a second plurality of the subsets of tone-symbols, the selected first plurality of the subsets of tone-symbols may be selected such that the transmitted first signal does not completely overlap with the second signal. That is, the selected first plurality of the subsets of tone-symbols selected to be used by the first device for its peer-to-peer connection does not completely overlap (or perhaps does not overlap at all) with the second subset of tone-symbols used by the WAN.

A signal (e.g., a pilot signal, a connection request, etc.) may be transmitted to the second device using the selected subset (e.g., first subset) of the plurality of subsets of tone-symbols 512. For instance, a first set of pilot modulation symbols may be transmitted by the first device in the selected first plurality of the subsets of tone-symbols to facilitate signal recovery at the second device, each of selected subsets of tone-symbols used by the first device including at least one tone-symbol to transmit the pilot modulation symbols 514. One special type of pilot is null pilot. The first device may further select one null pilot in each tile or subset. The null pilot may be a tone-symbol in which the first device may not send any energy. Consequently, the first device may restrain from transmitting any signal in a set of tone-symbols in the selected first plurality of the subsets of tone-symbols to facilitate signal recovery at the second device, each of selected subsets of tone-symbols used by the first device including at least one tone-symbol in which no signal is to be transmitted.

Alternatively the first device may transmit much less (e.g., less than 10%) energy in the null pilot than any other tone-symbol in the tile. In yet another embodiment, the first device may transmit known signal power and phase in the pilot tone symbols, in which case the pilot is a normal pilot, but not a null pilot. Knowing the power and phase in the pilot, the second device (receiver) will be able to measure the interference experienced in the pilot, e.g. by first estimating channel and calculating the channel estimation error. The second signal transmitted in the wireless wide area network may also include a second set of pilot modulation symbols, each subset of tone-symbols used by the wireless wide area network signal including at least one tone-symbol to transmit the second set of pilot modulation symbols, and wherein the tone-symbol used by the pilot of the wireless wide area network signal being different from the tone-symbol used by the pilot of the signal transmitted by the second device.

The first device may also obtain timing information for the peer-to-peer connection with the second device. In a first implementation, the first device may monitor the shared frequency spectrum to derive symbol timing information of a signal transmitted in the wireless wide area network (WAN) 516. The first device may then adjust the transmission timing as a function of the derived symbol timing information 518. In this instance, it is assumed that the second device also uses the signal transmitted in the wireless wide area network to obtain timing information.

In a second implementation, a control message is received from the second device, the control message including a timing adjustment request 520. The first device then adjusts its transmission timing as a function of the timing adjustment request 522.

The transmission timing may be adjusted so that the OFDM symbols of the signal transmitted to the second device are aligned with the OFDM symbols of signals transmitted in the wireless wide area network.

Figure 6:
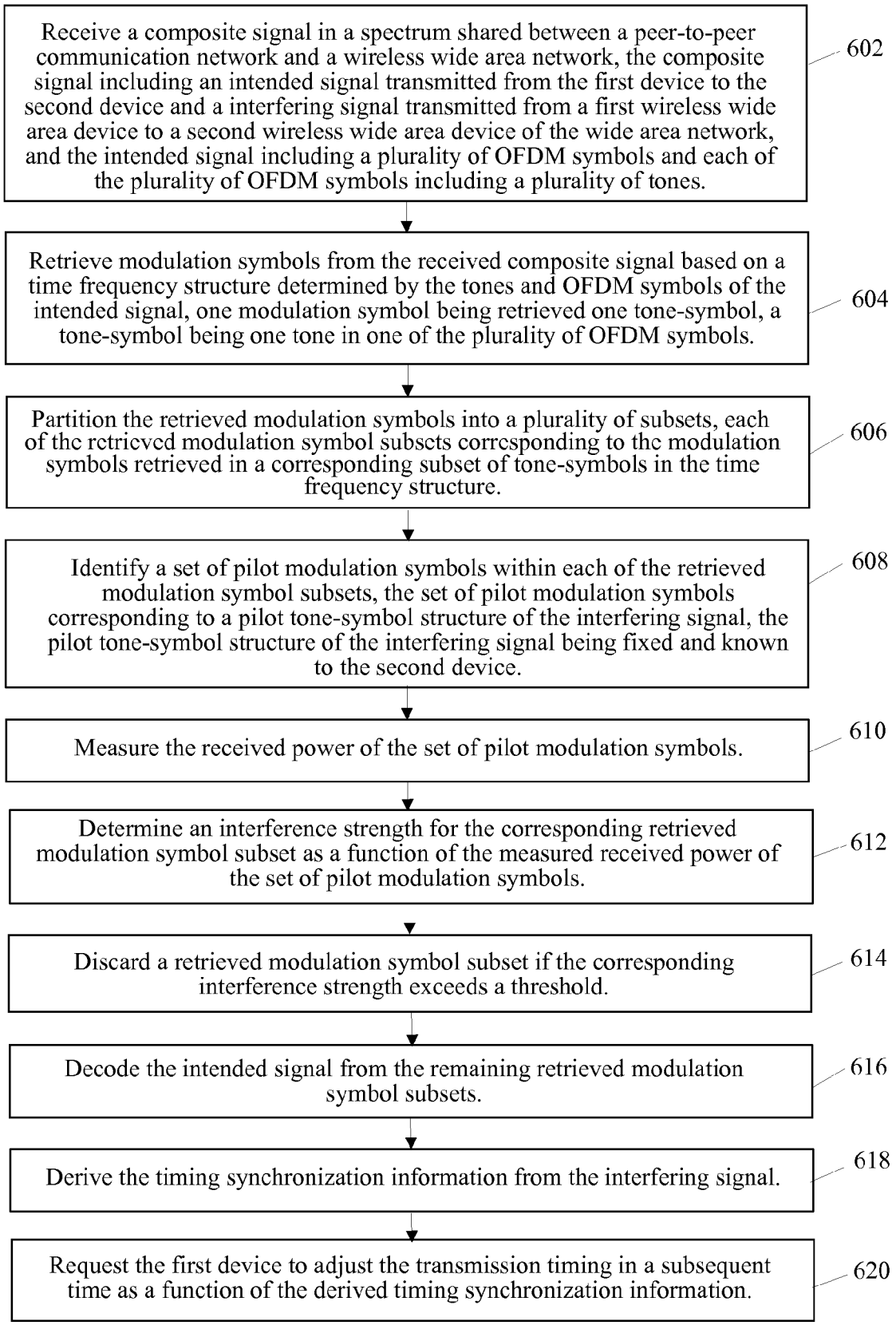
FIG. 6 illustrates a method for operating a second wireless device communicating with a first wireless device within a wireless peer-to-peer communication network.

FIG. 6 illustrates a method for operating a second wireless device communicating with a first wireless device within a wireless peer-to-peer communication network. The second device may receive a composite signal in a spectrum shared between the peer-to-peer communication network and a wireless wide area network, the composite signal including an intended signal transmitted from the first device to the second device and an interfering signal transmitted from a first wireless wide area device to a second wireless wide area device of the wide area network, and the intended signal including a plurality of OFDM symbols and each of the plurality of OFDM symbols including a plurality of tones 602. In one example, the first wireless wide area device may be a wireless access terminal and the second wireless wide area device is a base station. In another example, the second wireless wide area device may be a wireless access terminal and the first wireless wide area device may bee a base station.

The second device may then retrieve modulation symbols from the received composite signal based on a time frequency structure determined by the tones and OFDM symbols of the intended signal, one modulation symbol being retrieved one tone-symbol, a tone-symbol being one tone in one of the plurality of OFDM symbols 604.

The retrieved modulation symbols are then partitioned into a plurality of subsets, each of the retrieved modulation symbol subsets corresponding to the modulation symbols retrieved in a corresponding subset of tone-symbols in the time frequency structure 606. The subset of tone-symbols in the time frequency structure corresponding to the retrieved modulation symbol subsets may be independent or distinct from each other. A subset of tone-symbols corresponding to one of the retrieved modulation symbol subsets may include a tile of tone-symbols in the time frequency structure, the tile of tone-symbols consisting of contiguous tones in each of a plurality of contiguous OFDM symbols.

The interfering signal may also include a plurality of OFDM symbols and each of the plurality of OFDM symbols including a plurality of tones, and wherein the symbol duration of an OFDM symbol of the intended signal is substantially the same as the symbol duration of an OFDM symbol of the interfering signal and the tone spacing of the intended signal is substantially the same as the tone spacing of the interfering signal.

An interference strength is determined for each of the retrieved modulation symbol subsets 608. To do so, the second device may need to identify the null pilot, which is a tone-symbol in the time frequency grid whose location is based on the identifier of the connection. The second device knows that the first device does not send any signal energy in the null pilot. Therefore, the energy measured in the null pilot represents the interference. The second device may need to measure the null pilot for each tone-symbol subset separately. The measurement of interference power may be done independently from one subset to another. For example, one subset may experience excessive interference from a wireless WAN signal, while another subset may see little interference at all. A set of pilot modulation symbols may be identified within each of the retrieved modulation symbol subsets, the set of pilot modulation symbols corresponding to a pilot tone-symbol structure of the interfering signal, the pilot tone-symbol structure of the interfering signal being fixed and known to the second device 608. The received power of the set of pilot modulation symbols is measured 610. The interference strength of the corresponding retrieved modulation symbol subset may be determined as a function of the measured received power of the set of pilot modulation symbols 612.

The second device discards a retrieved modulation symbol subset if its corresponding interference strength exceeds a threshold 614. The intended signal is then decoded from the remaining retrieved modulation symbol subsets 616.

The second device may derive timing synchronization information from the interfering signal 618. For instance, such interfering signal may be a WAN pilot that can be used by both the first and second devices to derive timing. This may allow the second device to align its transmissions and or receptions from the first device with transmissions for the WAN. The second device may send a request to the first device to adjust the transmission timing in a subsequent time as a function of the derived timing synchronization information 620. The transmission timing may be requested to be adjusted so that the OFDM symbols of the intended signal from the first device are aligned with the OFDM symbols of the interfering signal.

Figure 7:
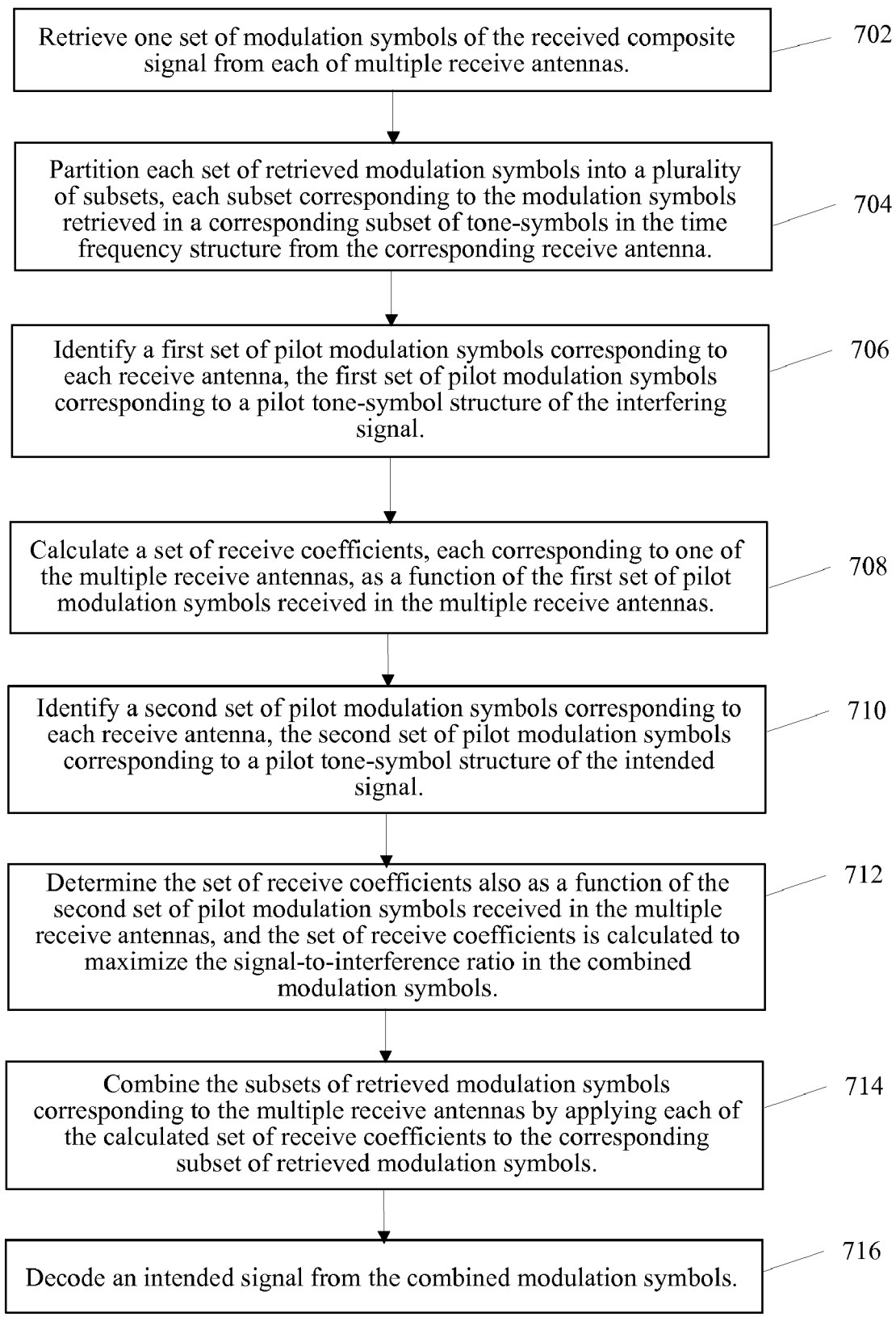
FIG. 7 illustrates how the method of FIG. 6 may operate in a first device having multiple receive antennas.

FIG. 7 illustrates how the method of FIG. 6 may operate in a first device having multiple receive antennas. One set of modulation symbols of the received composite signal is retrieved from each of multiple receive antennas 702. Each set of retrieved modulation symbols is partitioned into a plurality of subsets, each subset corresponding to the modulation symbols retrieved in a corresponding subset of tone-symbols in the time frequency structure from the corresponding receive antenna 704. The second device may identify a first set of pilot modulation symbols corresponding to each receive antenna, the first set of pilot modulation symbols corresponding to a pilot tone-symbol structure of the interfering signal 706. A set of receive coefficients is calculated, each corresponding to one of the multiple receive antennas, as a function of the first set of pilot modulation symbols received in the multiple receive antennas 708. For example, the set of receive coefficients may be calculated to minimize the remaining power of the interfering signal in the combined modulation symbols.

A second set of pilot modulation symbols corresponding to each receive antenna may be identified, the second set of pilot modulation symbols corresponding to a pilot tone-symbol structure of the intended signal 710. The set of receive coefficients may also be determined as a function of the second set of pilot modulation symbols received in the multiple receive antennas, and the set of receive coefficients is calculated to maximize the signal-to-interference ratio in the combined modulation symbols 712.

In one example, the pilot structure of the intended signal may be different from the pilot structure of the interfering signal and the first and second sets of pilot modulation symbols are different. Consequently, the first and second sets of pilot modulation symbols may be disjoint, distinct, or non-overlapping.

The second device combines the subsets of retrieved modulation symbols corresponding to the multiple receive antennas by applying each of the calculated set of receive coefficients to the corresponding subset of retrieved modulation symbols 714. The intended signal is then decoded from the combined modulation symbols 716.

Figure 8:
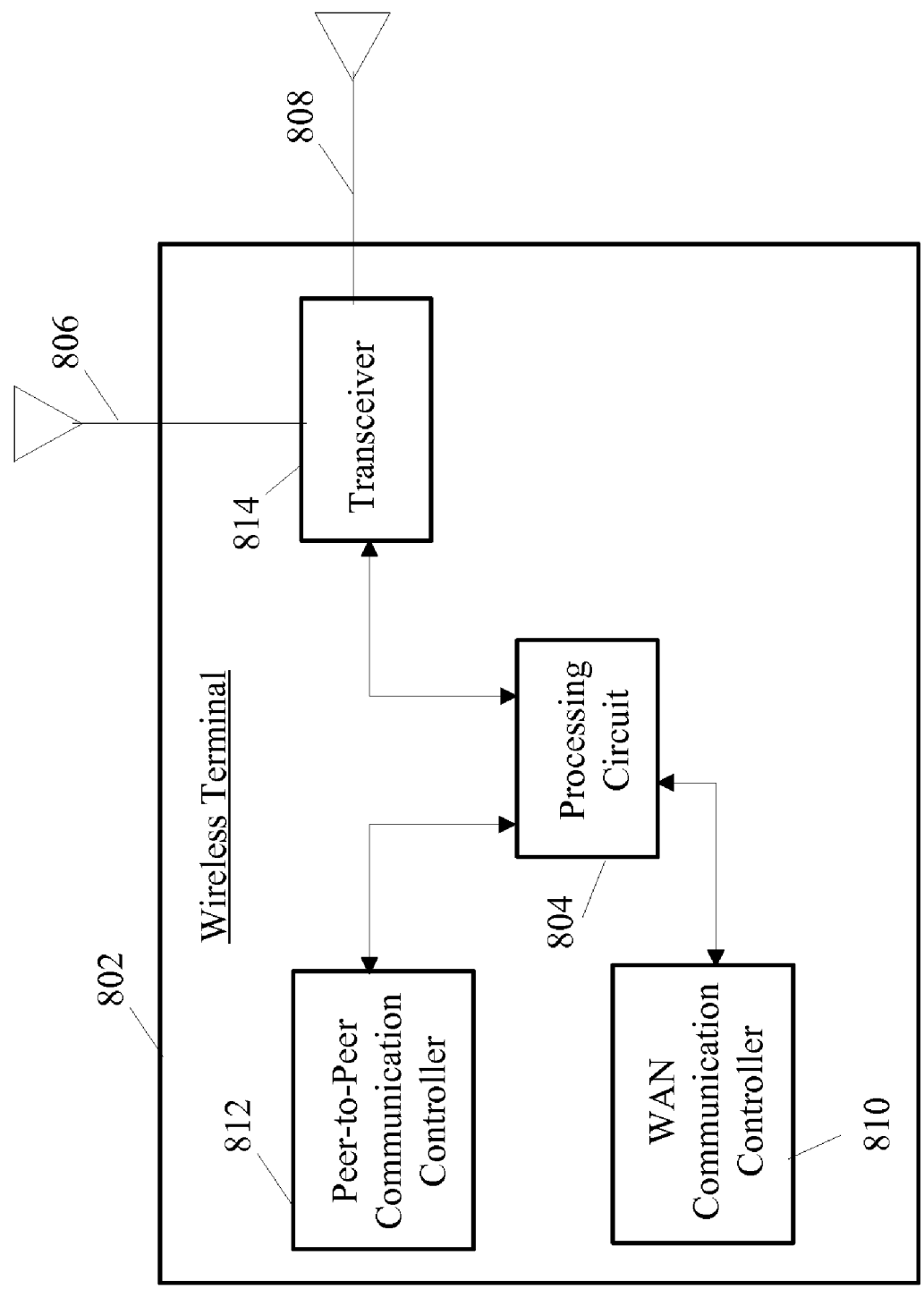
FIG. 8 is a block diagram of a wireless terminal that may be configured to reuse a time-frequency structure for a WAN with its peer-to-peer communications with a second wireless terminal over a shared frequency spectrum.

FIG. 8 is a block diagram of a wireless terminal that may be configured to reuse a time-frequency structure for a WAN with its peer-to-peer communications with a second wireless terminal over a shared frequency spectrum. The wireless terminal 802 may include a processing circuit (e.g., one or more circuits or processors), a peer-to-peer communication controller 812, a wide area network (WAN) controller 810 and a transceiver 814 coupled to either one or two antennas 806 and 808. The transceiver 814 may include a (wireless) transmitter and a (wireless) receiver. The wireless terminal 802 may communicate via a managed network infrastructure using the WAN communication controller 810 and/or it may communicate over a peer-to-peer network using the peer-to-peer communication controller 812. When performing peer-topeer communications, the wireless terminal 802 may be configured to perform one or more of the features illustrated in FIGS. 1-7.

Figure 9:
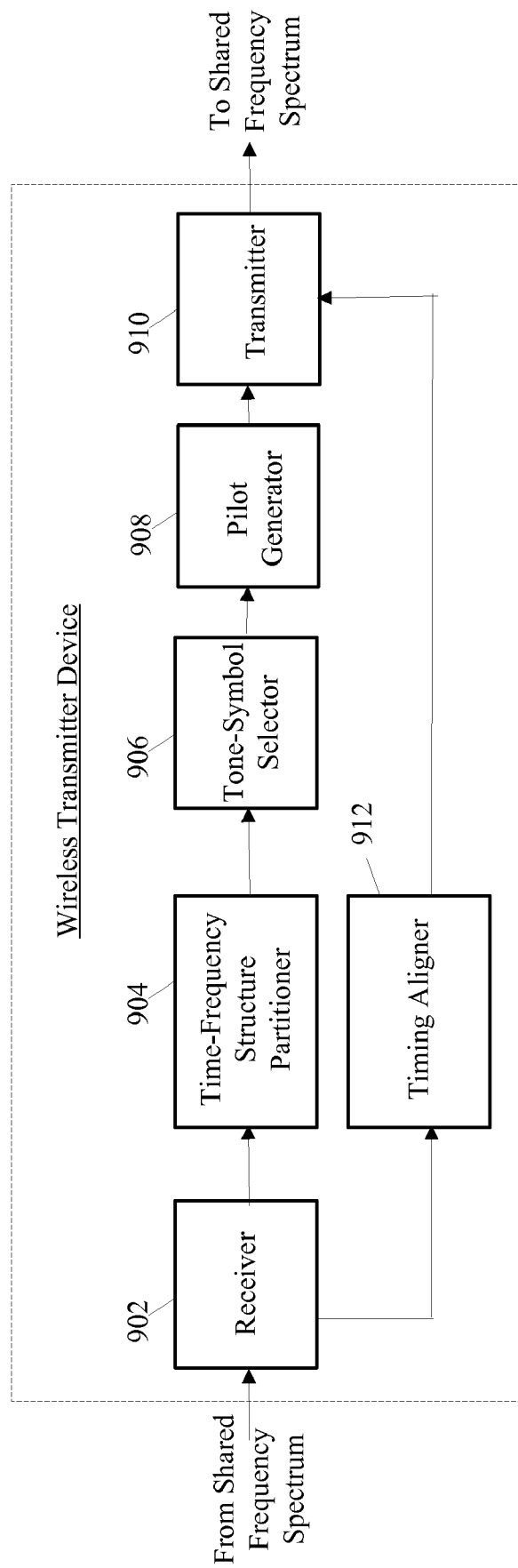
FIG. 9 is a block diagram of a wireless transmitter device configured to reuse a time-frequency structure for a WAN with its peer-to-peer communications with a second wireless terminal over a shared frequency spectrum.

FIG. 9 is a block diagram of a wireless transmitter device configured to reuse a time-frequency structure for a WAN with its peer-to-peer communications with a second wireless terminal over a shared frequency spectrum. The wireless transmitter device may include a receiver 902 with which to receive signals over the shared frequency spectrum. A time-frequency structure partitioner 904 may partition a time frequency structure into a plurality of subsets of tone-symbols, the time frequency structure including a plurality of orthogonal frequency-division multiplexing (OFDM) symbols and each of the plurality of OFDM symbols including a plurality of tones, a tone-symbol being one tone in one of the plurality of OFDM symbols. A tone-symbol selector 906 may select a first subset of the plurality of subsets of tone-symbols. A pilot generator 908 may generate a set of pilot modulation symbols in the selected first subset of the plurality of subsets of tone-symbols to facilitate signal recovery at the second wireless terminal, each of selected subsets of tone-symbols used by the first device including at least one tone-symbol to transmit the pilot modulation symbols. A transmitter 910 may then transmit a signal to the second wireless terminal using the selected first subset of the plurality of subsets of tone-symbols. A timing aligner 912 may be configured to adjust the transmission timing of the wireless transmitter terminal as a function of at least one of either derived symbol timing information or a timing adjustment request.

Figure 10:
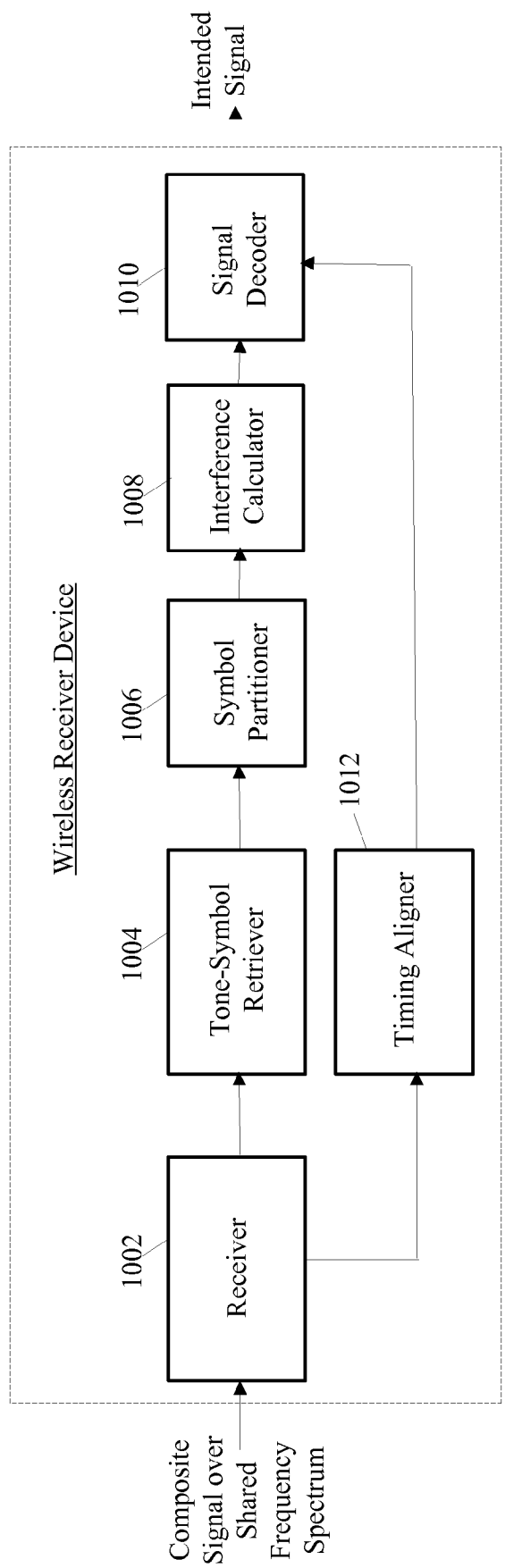
FIG. 10 is a block diagram of a wireless receiver device configured to reuse a time-frequency structure for a WAN with its peer-to-peer communications with a first wireless terminal over a shared frequency spectrum.

FIG. 10 is a block diagram of a wireless receiver device configured to reuse a time-frequency structure for a WAN with its peer-to-peer communications with a first wireless terminal over a shared frequency spectrum. A receiver 1002 may receive a composite signal in a spectrum shared between the peer-to-peer communication network and a wireless wide area network, the composite signal including an intended signal transmitted from the first wireless terminal to the wireless receiver device and an interfering signal transmitted from a first wireless wide area device to a second wireless wide area device of the wide area network, and the intended signal including a plurality of OFDM symbols and each of the plurality of OFDM symbols including a plurality of tones. A tone-symbol retriever 1004 is configured to retrieve modulation symbols from the received composite signal based on a time frequency structure determined by the tones and OFDM symbols of the intended signal, one modulation symbol being retrieved one tone-symbol, a tone-symbol being one tone in one of the plurality of OFDM symbols. A symbol partitioner 1006 may partition the retrieved modulation symbols into a plurality of subsets, each of the retrieved modulation symbol subsets corresponding to the modulation symbols retrieved in a corresponding subset of tone-symbols in the time frequency structure. An interference calculator 1008 may be configured to determine the interference strength of each of the retrieved modulation symbol subsets. Note that a retrieved modulation symbol subset is discarded if the corresponding interference strength exceeds a threshold. A signal decoder 1010 may decode the intended signal from the remaining retrieved modulation symbol subsets. A timing aligner 1012 may derive the timing synchronization information from the interfering signal and allow the wireless receiver terminal to request the first wireless terminal to adjust its transmission timing in a subsequent time as a function of the derived timing synchronization information.

While described in the context of an OFDM TDD system, the methods and apparatus of various embodiments are applicable to a wide range of communications systems including many non-OFDM, many non-TDD systems, and/or many non-cellular systems.

In various embodiments nodes described herein are implemented using one or more modules to perform the steps corresponding to one or more methods, for example, generating a beacon signal, transmitting a beacon signal, receiving beacon signals, monitoring for beacon signals, recovering information from received beacon signals, determining a timing adjustment, implementing a timing adjustment, changing a mode of operation, initiating a communication session, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

According to yet another configuration, one or more circuits may be in a mobile device may be adapted to perform the operations and/or functions described in FIGS. 1-10. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

One or more of the components, steps, and/or functions illustrated in FIGS. 1, 2, 3, 4, 5, 6, 7, 8, 9 and/or 10 may be rearranged and/or combined into a single component, step, or function or embodied in several components, steps, or functions. Additional elements, components, steps, and/or functions may also be added. The apparatus, devices, and/or components illustrated in FIGS. 8, 9 and/or 10 may be configured or adapted to perform one or more of the methods, features, or steps described in FIGS. 2, 3, 4, 5, 6, and/or 7. The algorithms described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, the secondary microphone cover detector may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method for operating a first wireless device communicating with a second wireless device within a wireless peer-to-peer communication network, the wireless peer-to-peer communication network sharing a frequency spectrum with a wireless wide area network, comprising:
    partitioning a time frequency structure into a plurality of subsets of tone-symbols, the time frequency structure including a plurality of orthogonal frequency-division multiplexing (OFDM) symbols and each of the plurality of OFDM symbols including a plurality of tones, a tone-symbol being one tone in one of the plurality of OFDM symbols;
    selecting a first plurality of tone-symbols from the tone-symbols in said plurality of OFDM symbols, said first plurality of tone-symbols partially overlapping tone-symbols used by said wide area network for wide area network signal transmission during a first time period and including at least one tone-symbol which is not used by said wide area network for wide area network signal transmission during said first time period; and
    transmitting a peer-to-peer signal to the second device using the first plurality of tone-symbols during said first time period.

2. The method of claim 1, wherein transmitting a peer to peer signal to the second device using the first subset of tone symbols includes using at least one tone-symbol in said first plurality of tone symbols as a null pilot wherein no energy is transmitted by said first wireless device on said at least one tone-symbol used as a null pilot during said first period of time.

3. The method of claim 2, wherein transmitting a peer to peer signal to the second device using the first plurality of tone symbols includes:
    including at least one non-null pilot on a tone-symbol included in said first plurality of tone-symbols.

4. The method of claim 3, wherein said first time period is a first traffic slot, the method further comprising:
    using a different subset of tone-symbols in another traffic slot following said first traffic slot.

5. The method of claim 4, further comprising:
    monitoring the shared frequency spectrum to measure the power of signals transmitted in the wireless wide area network;
    identifying one or more subsets of tone-symbols for which the measured power of signals transmitted in the wireless wide area network are below a threshold; and
    wherein the first plurality of tone-symbols used to transmit the signal to the second device are selected from tone-symbols in the identified subsets.

6. The method of claim 4, wherein a second signal transmitted in the wireless wide area network is generated using a second plurality of tone-symbols which does not completely overlap with the first plurality of tone-symbols selected to be used by the first device.

7. The method of claim 6, wherein the second signal transmitted in the wireless wide area network also includes a set of pilot modulation symbols, each of subsets of tone-symbols used by the second signal including at least one tone-symbol to transmit the pilot modulation symbols, and wherein the tone-symbol used by the pilot of the wireless wide area network signal being different from the tone-symbol used by the pilot of the signal transmitted by the second device.

8. The method of claim 4, further comprising:
    wherein said non-null pilot is a pilot modulation symbol.

9. The method of claim 2, wherein the first plurality of tone-symbols which is selected is determined by said first wireless device based on a peer-to-peer connection identifier.

10. A method for operating a first wireless device communicating with a second wireless device within a wireless peer-to-peer communication network, the wireless peer-to-peer communication network sharing a frequency spectrum with a wireless wide area network, comprising:
    partitioning a time frequency structure into a plurality of subsets of tone-symbols, the time frequency structure including a plurality of orthogonal frequency-division multiplexing (OFDM) symbols and each of the plurality of OFDM symbols including a plurality of tones, a tone-symbol being one tone in one of the plurality of OFDM symbols;
    selecting a first plurality of the subsets of tone-symbols;
    transmitting a signal to the second device using the selected subset of the plurality of subsets of tone-symbols;
    monitoring the shared spectrum to derive symbol timing information of a signal transmitted in the wireless wide area network; and
    adjusting the transmission timing as a function of the derived symbol timing information.

11. The method of claim 10, further comprising:
    receiving a control message from the second device, the control message including a timing adjustment request; and
    adjusting the transmission timing as a function of the timing adjustment request.

12. The method of claim 10, wherein the transmission timing is adjusted so that the OFDM symbols of the first signal transmitted to the first device are aligned with the OFDM symbols of the signal transmitted in the wireless wide area network.

13. A first device configured to communicate with a second device within a wireless peer-to-peer communication network, the wireless peer-to-peer communication network sharing a frequency spectrum with a wireless wide area network (WAN), comprising:
    a transmitter and receiver for establishing a wireless peer-to-peer communication connection with the second device; and
    a processing circuit adapted to reuse a time-frequency structure of the WAN for communications over the peer-to-peer communication connection with the second device, the processing circuit configured to:

partition a time frequency structure into a plurality of subsets of tone-symbols, the time frequency structure including a plurality of orthogonal frequency-division multiplexing (OFDM) symbols and each of the plurality of OFDM symbols including a plurality of tones, a tone-symbol being one tone in one of the plurality of OFDM symbols;

select a first plurality of tone-symbols from the tone-symbols in said plurality of OFDM symbols, said first plurality of tone-symbols partially overlapping tone-symbols used by said wide area network for wide area network signal transmission during a first time period and including at least one tone-symbol which is not used by said wide area network for wide area network signal transmission during said first time period; and transmit a peer to peer signal to the second device using the first plurality of tone-symbols during said first time period.

14. The first device of claim 13, wherein transmitting a peer to peer signal to the second device using the first subset of tone symbols includes using at least one tone-symbol in said first plurality of tone symbols as a null pilot wherein no energy is transmitted by said first wireless device on said at least one tone-symbol used as a null pilot during said first period of time.

15. The first device of claim 13, wherein transmitting a peer to peer signal to the second device using the first plurality of tone symbols includes:

including at least one non-null pilot on a tone-symbol included in said first plurality of tone-symbols.

16. The first device of claim 15, wherein the processing circuit is further configured to:

monitor the shared frequency spectrum to measure the power of signals transmitted in the wireless wide area network;

identify one or more subsets of tone-symbols for which the measured power of signals transmitted in the wireless wide area network are below a threshold; and wherein the first plurality of tone-symbols used to transmit the signal to the second device are selected from the tone-symbols in the identified subsets.

17. A first device configured to communicate with a second device within a wireless peer-to-peer communication network, the wireless peer-to-peer communication network sharing a frequency spectrum with a wireless wide area network (WAN), comprising:

means for partitioning a time frequency structure into a plurality of subsets of tone-symbols, the time frequency structure including a plurality of orthogonal frequency-division multiplexing (OFDM) symbols and each of the plurality of OFDM symbols including a plurality of tones, a tone-symbol being one tone in one of the plurality of OFDM symbols;

means for selecting a first plurality of tone-symbols from the tone-symbols in said plurality of OFDM symbols, said first plurality of tone-symbols partially overlapping tone-symbols used by said wide area network for wide area network signal transmission during a first time period and including at least one tone-symbol which is not used by said wide area network for wide area network signal transmission during said first time period; and means for transmitting a peer to peer signal to the second device using the first plurality of tone-symbols.

18. A circuit for reusing a time-frequency structure of a wide area network (WAN) for communications over a peer-to-peer communication connection between a first device and a second device, where the wireless peer-to-peer communication connection shares a frequency spectrum with the WAN, wherein the circuit operates in the first device and is adapted to:

partition a time frequency structure into a plurality of subsets of tone-symbols, the time frequency structure including a plurality of orthogonal frequency-division multiplexing (OFDM) symbols and each of the plurality of OFDM symbols including a plurality of tones, a tone-symbol being one tone in one of the plurality of OFDM symbols;

select a first plurality of tone-symbols from the tone-symbols in said plurality of OFDM symbols, said first plurality of tone-symbols partially overlapping tone-symbols used by said wide area network for wide area network signal transmission during a first time period and including at least one tone-symbol which is not used by said wide area network for wide area network signal transmission during said first time period; and transmit a peer to peer signal to the second device using the first plurality of tone-symbols.

19. A non-transitory machine-readable medium comprising instructions for a first device to communicate with a second device within a wireless peer-to-peer communication network, the wireless peer-to-peer communication network sharing a frequency spectrum with a wireless wide area network (WAN), which when executed by a processor causes the processor to:

partition a time frequency structure into a plurality of subsets of tone-symbols, the time frequency structure including a plurality of orthogonal frequency-division multiplexing (OFDM) symbols and each of the plurality of OFDM symbols including a plurality of tones, a tone-symbol being one tone in one of the plurality of OFDM symbols;

select a first plurality of tone-symbols from the tone-symbols in said plurality of OFDM symbols, said first plurality of tone-symbols partially overlapping tone-symbols used by said wide area network for wide area network signal transmission during a first time period and including at least one tone-symbol which is not used by said wide area network for wide area network signal transmission during said first time period; and transmit a peer to peer signal to the second device using the first plurality of tone-symbols.

20. A method for operating a second wireless device communicating with a first wireless device within a wireless peer to peer communication network, comprising:

receiving a composite signal in a frequency spectrum shared between the peer-to-peer communication network and a wireless wide area network, the composite signal including an intended signal transmitted from the first device to the second device and an interfering signal transmitted from a first wireless wide area device to a second wireless wide area device of the wide area network, and the intended signal including a plurality of OFDM symbols and each of the plurality of OFDM symbols including a plurality of tones;

retrieving modulation symbols from the received composite signal based on a time frequency structure determined by the tones and OFDM symbols of the intended signal, one modulation symbol being retrieved one tone-symbol, a tone-symbol being one tone in one of the plurality of OFDM symbols;

partitioning the retrieved modulation symbols into a plurality of subsets, each of the retrieved modulation symbol subsets corresponding to the modulation symbols retrieved in a corresponding subset of tone-symbols in the time frequency structure;

determining the interference strength of each of the retrieved modulation symbol subsets; and wherein the interfering signal also includes a plurality of OFDM symbols and each of the plurality of OFDM symbols including a plurality of tones, and wherein the symbol duration of an OFDM symbol of the intended signal is substantially the same as the symbol duration of an OFDM symbol of the interfering signal and the tone spacing of the intended signal is substantially the same as the tone spacing of the interfering signal.

21. The method of claim 20, further comprising:

discarding a retrieved modulation symbol subset if the corresponding interference strength exceeds a threshold; and decoding the intended signal from the remaining retrieved modulation symbol subsets.

22. The method of claim 20, wherein the subset of tone-symbols in the time frequency structure corresponding to the retrieved modulation symbol subsets is non-overlapping with each other.

23. The method of claim 22, wherein a subset of tone-symbols corresponding to one of the retrieved modulation symbol subsets includes a tile of tone-symbols in the time frequency structure, the tile of tone-symbols consisting of contiguous tones in each of a plurality of contiguous OFDM symbols.

24. The method of claim 20, further comprising:

identifying a set of pilot modulation symbols within each of the retrieved modulation symbol subsets, the set of pilot modulation symbols corresponding to a pilot tone-symbol structure of the interfering signal, the pilot tone-symbol structure of the interfering signal being fixed and known to the second device;

measuring the received power of the set of pilot modulation symbols; and wherein the interference strength of the corresponding retrieved modulation symbol subset is determined as a function of the measured received power of the set of pilot modulation symbols.

25. The method of claim 24, wherein the second device is equipped with multiple receive antennas, the method further comprising:

retrieving one set of modulation symbols of the received composite signal from each of multiple receive antennas;

partitioning each set of retrieved modulation symbols into a plurality of subsets, each subset corresponding to the modulation symbols retrieved in a corresponding subset of tone-symbols in the time frequency structure from the corresponding receive antenna;

identifying a first set of pilot modulation symbols corresponding to each receive antenna, the first set of pilot modulation symbols corresponding to a pilot tone-symbol structure of the interfering signal, calculating a set of receive coefficients, each corresponding to one of the multiple receive antennas, as a function of the first sets of pilot modulation symbols received in the multiple receive antennas;

combining the subsets of retrieved modulation symbols corresponding to the multiple receive antennas by applying each of the calculated set of receive coefficients to the corresponding subset of retrieved modulation symbols; and decoding the intended signal from the combined modulation symbols.

26. The method of claim 25, wherein the set of receive coefficients is calculated to minimize the remaining power of the interfering signal in the combined modulation symbols.

27. The method of claim 25, the method further comprising:

identifying a second set of pilot modulation symbols corresponding to each receive antenna, the second set of pilot modulation symbols corresponding to a pilot tone-symbol structure of the intended signal; and wherein the set of receive coefficients is determined also as a function of the second sets of pilot modulation symbols received in the multiple receive antennas, and the set of receive coefficients is calculated to maximize the signal-to-interference ratio in the combined modulation symbols.

28. The method of claim 27, wherein the pilot structure of the intended signal is different from the pilot structure of the interfering signal and the first and second sets of pilot modulation symbols are different.

29. The method of claim 28, wherein the first and second sets of pilot modulation symbols are non-overlapping.

30. The method of claim 29, wherein the first wireless wide area device is a wireless access terminal and the second wireless wide area device is a base station.

31. The method of claim 29, wherein the second wireless wide area device is a wireless access terminal and the first wireless wide area device is a base station.

32. The method of claim 20, further comprising:

deriving the timing synchronization information from the interfering signal; and requesting the first device to adjust the transmission timing in a subsequent time as a function of the derived timing synchronization information.

33. The method of claim 32, wherein the transmission timing is requested to be adjusted so that the OFDM symbols of the intended signal from the first device are aligned with the OFDM symbols of the interfering signal.

34. A second device configured to communicate with a first device within a wireless peer-to-peer communication network, comprising:

a transmitter and receiver for establishing a wireless peer-to-peer communication connection with the second device; and a processing circuit adapted to reuse a time-frequency structure of the WAN for communications over the peer-to-peer communication connection with the second device, the processing circuit configured to:

receive a composite signal in a frequency spectrum shared between the peer-to-peer communication network and a wireless wide area network, the composite signal including an intended signal transmitted from the first device to the second device and an interfering signal transmitted from a first wireless wide area device to a second wireless wide area device of the wide area network, and the intended signal including a plurality of OFDM symbols and each of the plurality of OFDM symbols including a plurality of tones;

retrieve modulation symbols from the received composite signal based on a time frequency structure determined by the tones and OFDM symbols of the intended signal, one modulation symbol being retrieved one tone-symbol, a tone-symbol being one tone in one of the plurality of OFDM symbols;

partition the retrieved modulation symbols into a plurality of subsets, each of the retrieved modulation symbol subsets corresponding to the modulation symbols retrieved in a corresponding subset of tone-symbols in the time frequency structure;

determine the interference strength of each of the retrieved modulation symbol subsets; and wherein the interfering signal also includes a plurality of OFDM symbols and each of the plurality of OFDM symbols including a plurality of tones, and wherein the symbol duration of an OFDM symbol of the intended signal is substantially the same as the symbol duration of an OFDM symbol of the interfering signal and the tone spacing of the intended signal is substantially the same as the tone spacing of the interfering signal.

35. The second device of claim 34, wherein the processing circuit is further configured to:

discard a retrieved modulation symbol subset if the corresponding interference strength exceeds a threshold; and decode the intended signal from the remaining retrieved modulation symbol subsets.

36. The second device of claim 34, further comprising:

a plurality of receive antennas, wherein the processing circuit is further configured to:

retrieve one set of modulation symbols of the received composite signal from each of multiple receive antennas;

partition each set of retrieved modulation symbols into a plurality of subsets, each subset corresponding to the modulation symbols retrieved in a corresponding subset of tone-symbols in the time frequency structure from the corresponding receive antenna;

identify a first set of pilot modulation symbols corresponding to each receive antenna, the first set of pilot modulation symbols corresponding to a pilot tone-symbol structure of the interfering signal, calculate a set of receive coefficients, each corresponding to one of the multiple receive antennas, as a function of the first sets of pilot modulation symbols received in the multiple receive antennas;

combine the subsets of retrieved modulation symbols corresponding to the multiple receive antennas by applying each of the calculated set of receive coefficients to the corresponding subset of retrieved modulation symbols; and decode the intended signal from the combined modulation symbols.

37. A second device configured to communicate with a first device within a wireless peer-to-peer communication network, comprising:

means for receiving a composite signal in a spectrum shared between the peer-to-peer communication network and a wireless wide area network, the composite signal including an intended signal transmitted from the first device to the second device and an interfering signal transmitted from a first wireless wide area device to a second wireless wide area device of the wide area network, and the intended signal including a plurality of OFDM symbols and each of the plurality of OFDM symbols including a plurality of tones;

means for retrieving modulation symbols from the received composite signal based on a time frequency structure determined by the tones and OFDM symbols of the intended signal, one modulation symbol being retrieved one tone-symbol, a tone-symbol being one tone in one of the plurality of OFDM symbols;

means for partitioning the retrieved modulation symbols into a plurality of subsets, each of the retrieved modulation symbol subsets corresponding to the modulation symbols retrieved in a corresponding subset of tone-symbols in the time frequency structure;

means for determining the interference strength of each of the retrieved modulation symbol subsets; and wherein the interfering signal also includes a plurality of OFDM symbols and each of the plurality of OFDM symbols including a plurality of tones, and wherein the symbol duration of an OFDM symbol of the intended signal is substantially the same as the symbol duration of an OFDM symbol of the interfering signal and the tone spacing of the intended signal is substantially the same as the tone spacing of the interfering signal.

38. A circuit for reusing a time-frequency structure of a wide area network (WAN) for communications over a peer-to-peer communication connection between a first device and a second device, wherein the circuit operates in the second device and is adapted to:

receive a composite signal in a frequency spectrum shared between the peer-to-peer communication network and a wireless wide area network, the composite signal including an intended signal transmitted from the first device to the second device and an interfering signal transmitted from a first wireless wide area device to a second wireless wide area device of the wide area network, and the intended signal including a plurality of OFDM symbols and each of the plurality of OFDM symbols including a plurality of tones;

retrieve modulation symbols from the received composite signal based on a time frequency structure determined by the tones and OFDM symbols of the intended signal, one modulation symbol being retrieved one tone-symbol, a tone-symbol being one tone in one of the plurality of OFDM symbols;

partition the retrieved modulation symbols into a plurality of subsets, each of the retrieved modulation symbol subsets corresponding to the modulation symbols retrieved in a corresponding subset of tone-symbols in the time frequency structure;

determine the interference strength of each of the retrieved modulation symbol subsets; and wherein the interfering signal also includes a plurality of OFDM symbols and each of the plurality of OFDM symbols including a plurality of tones, and wherein the symbol duration of an OFDM symbol of the intended signal is substantially the same as the symbol duration of an OFDM symbol of the interfering signal and the tone spacing of the intended signal is substantially the same as the tone spacing of the interfering signal.

39. A non-transitory machine-readable medium comprising instructions for a second device to communicate with a first device within a wireless peer-to-peer communication network, which when executed by a processor causes the processor to:

receive a composite signal in a frequency spectrum shared between the peer-to-peer communication network and a wireless wide area network, the composite signal including an intended signal transmitted from the first device to the second device and an interfering signal transmitted from a first wireless wide area device to a second wireless wide area device of the wide area network, and the intended signal including a plurality of OFDM symbols and each of the plurality of OFDM symbols including a plurality of tones;

retrieve modulation symbols from the received composite signal based on a time frequency structure determined by the tones and OFDM symbols of the intended signal, one modulation symbol being retrieved one tone-symbol, a tone-symbol being one tone in one of the plurality of OFDM symbols;
partition the retrieved modulation symbols into a plurality of subsets, each of the retrieved modulation symbol subsets corresponding to the modulation symbols retrieved in a corresponding subset of tone-symbols in the time frequency structure;
determine the interference strength of each of the retrieved modulation symbol subsets; and
wherein the interfering signal also includes a plurality of OFDM symbols and each of the plurality of OFDM symbols including a plurality of tones, and wherein the symbol duration of an OFDM symbol of the intended signal is substantially the same as the symbol duration of an OFDM symbol of the interfering signal and the tone spacing of the intended signal is substantially the same as the tone spacing of the interfering signal.

40. A first wireless device communicating with a second wireless device within a wireless peer-to-peer communication network, the wireless peer-to-peer communication network sharing a frequency spectrum with a wireless wide area network, the first wireless device comprising:
means for partitioning a time frequency structure into a plurality of subsets of tone-symbols, the time frequency structure including a plurality of orthogonal frequency-division multiplexing (OFDM) symbols and each of the plurality of OFDM symbols including a plurality of tones, a tone-symbol being one tone in one of the plurality of OFDM symbols;
means for selecting a first plurality of the subsets of tone-symbols;
means for transmitting a signal to the second device using the selected subset of the plurality of subsets of tone-symbols;
means for monitoring the shared spectrum to derive symbol timing information of a signal transmitted in the wireless wide area network; and
means for adjusting the transmission timing as a function of the derived symbol timing information.

41. A circuit for reusing a time-frequency structure of a wide area network (WAN) for communications over a peer-to-peer communication connection between a first device and a second device, where the wireless peer-to-peer communication connection shares a frequency spectrum with the WAN, wherein the circuit operates in the first device and is adapted to:
partition a time frequency structure into a plurality of subsets of tone-symbols, the time frequency structure including a plurality of orthogonal frequency-division multiplexing (OFDM) symbols and each of the plurality of OFDM symbols including a plurality of tones, a tone-symbol being one tone in one of the plurality of OFDM symbols;
select a first plurality of the subsets of tone-symbols;
transmit a signal to the second device using the selected subset of the plurality of subsets of tone-symbols;
monitor the shared spectrum to derive symbol timing information of a signal transmitted in the wireless wide area network; and
adjust the transmission timing as a function of the derived symbol timing information.

42. A non-transitory machine-readable medium comprising instructions for a first device to communicate with a second device within a wireless peer-to-peer communication network, the wireless peer-to-peer communication network sharing a frequency spectrum with a wireless wide area network (WAN), which when executed by a processor causes the processor to:
partition a time frequency structure into a plurality of subsets of tone-symbols, the time frequency structure including a plurality of orthogonal frequency-division multiplexing (OFDM) symbols and each of the plurality of OFDM symbols including a plurality of tones, a tone-symbol being one tone in one of the plurality of OFDM symbols;
select a first plurality of the subsets of tone-symbols;
transmit a signal to the second device using the selected subset of the plurality of subsets of tone-symbols;
monitor the shared spectrum to derive symbol timing information of a signal transmitted in the wireless wide area network; and
adjust the transmission timing as a function of the derived symbol timing information.

* * * * *